T. BROWN.
MANURE SPREADER.
APPLICATION FILED OCT. 7, 1911.
1,215,616.
Patented Feb. 13, 1917.
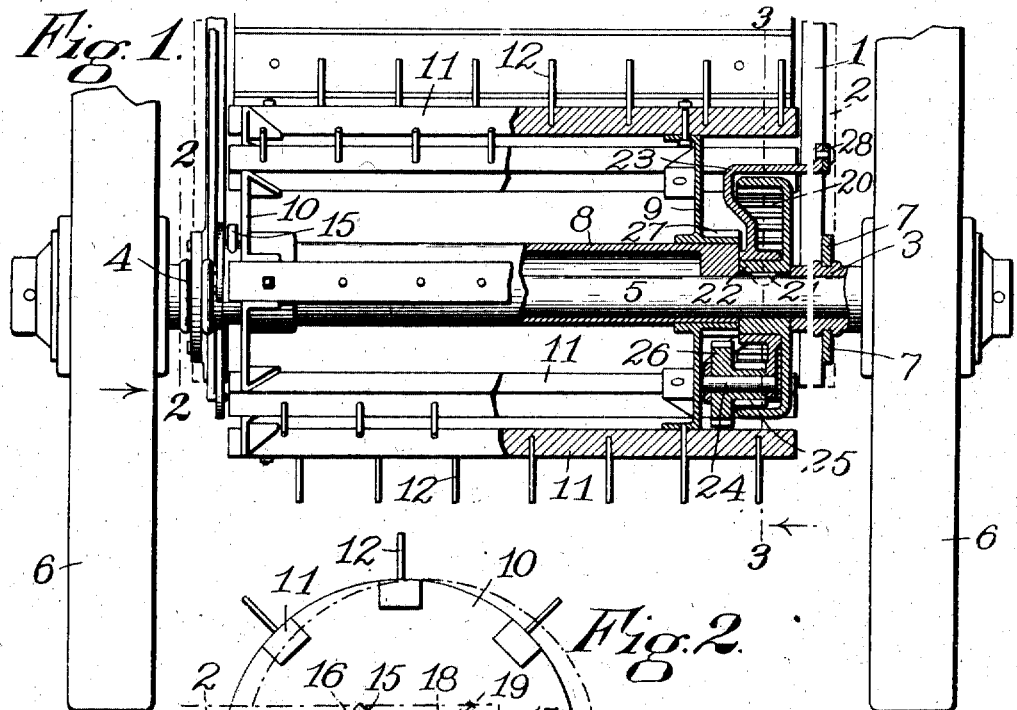
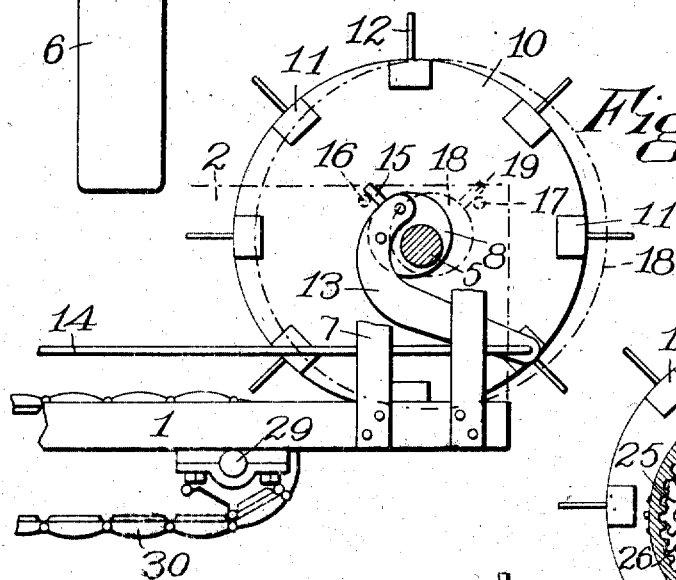
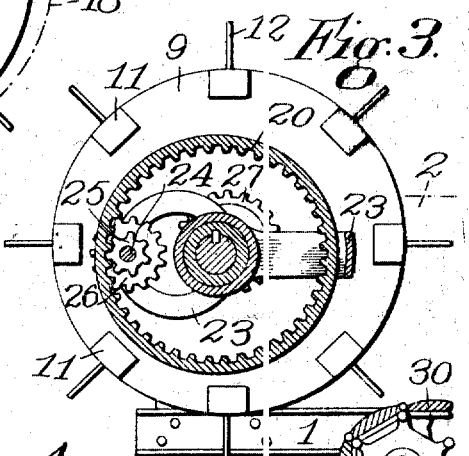
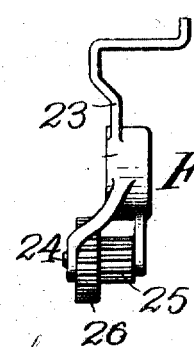
Witnesses
R. D. Tolman
Penelope Comberbach
Inventor
Theophilus Brown
By Rupert R. Fowler
Attorney

UNITED STATES PATENT OFFICE.

THEOPHILUS BROWN, OF WORCESTER, MASSACHUSETTS, ASSIGNOR, BY MESNE ASSIGNMENTS, TO MARSEILLES COMPANY, OF EAST MOLINE, ILLINOIS, A CORPORATION OF ILLINOIS.

MANURE-SPREADER.

1,215,616.  Specification of Letters Patent.  Patented Feb. 13, 1917.

Application filed October 7, 1911. Serial No. 653,453.

*To all whom it may concern:*

Be it known that I, THEOPHILUS BROWN, a citizen of the United States, residing at Worcester, in the county of Worcester and Commonwealth of Massachusetts, have invented a certain new and useful Improvement in Manure-Spreaders, of which the following is a specification accompanied by drawings forming a part of the same.

My present invention relates to that class of manure spreaders which comprise a body with a movable bottom by which the load is gradually moved rearwardly against the teeth of a revolving beater. The objects of my present invention are to simplify the construction, increase the resistance to the strains applied to the beater, to provide means for releasing the beater from its engagement with the load, and to provide means for throwing the beater in and out of operative relation to the driving power. I accomplish these objects among others by the construction and arrangement of parts as hereinafter described and pointed out in the annexed claims.

Referring to the accompanying drawings,

Figure 1 represents a plan view of the rear part of a manure spreader, a portion being shown in sectional view to disclose the construction and operation of the driving mechanism for rotating the beater.

Fig. 2 is an end view of the beater with the rear axle shown in sectional view on the plane of the broken line 2—2, Fig. 1.

Fig. 3 is an end view of the beater shown in section on the plane of the broken line 3—3, Fig. 1.

Fig. 4 is a detached view of the framework carrying the intermediate pinions between the driving and driven elements of the beater driving mechanism.

Similar reference characters refer to similar parts in the different figures.

Referring to the drawings 1, 1, denote the longitudinal sills forming a portion of the framework of the body, their rear ends only being shown. Upon the sills 1, 1 suitable sides are mounted which have been removed in the drawings, but their position is indicated by the broken lines 2—2. Journaled in collars 3, 4 is a rear axle 5, to the ends of which supporting wheels 6, 6, are attached. The sills 1, 1, in the present instance, are suspended from the collars 3, 4 by means of inverted U-shaped brackets 7. Mounted upon the axle 5 is an eccentric 8, upon the ends of which are journaled the circular heads 9 and 10 of a beater comprising crossbars 11, supported on the periphery of the heads 9 and 10 and carrying radial pins or teeth 12. The eccentric 8 is rotatable, to a limited extent, around the axle 5 by means of a lever 13 attached to one end of the eccentric and having its free end pivotally connected to a rod 14 which extends forward to the driver's seat, and is capable of being pushed or pulled by an attendant to turn the eccentric 8 about the axle 5.

A stop pin 15 is carried by the eccentric 8 and arranged to contact with fixed stops held in the side of the manure spreader, the relative position of the said stops being indicated by the broken lines 16 and 17, Fig. 2, thereby limiting the rotative movement of the eccentric 8 about the axle 5 and permitting the beater to be held in the position shown by full lines in Fig. 2, or to be moved rearwardly into the position shown by the broken lines 18, Fig. 2, with the position of the eccentric indicated by broken lines 19.

When the beater is in the position indicated by solid lines in Fig. 2, it may serve as a tailboard to retain the load during loading or passing to the field, but when the beater is moved into the position indicated by the broken lines 18 its teeth 12 are partially released from the load, allowing the beater to be engaged with the driving power. The driving mechanism for the beater comprises an internal gear 20 keyed at 21 to the shaft 5. Journaled upon the hub 22 of the internal gear is a frame 23 in which is supported a fixed stub 24 on which loosely rotates the integral pinions 25 and 26. The pinion 25 is in constant engagement with the internal gear 20, causing rotary motion to be imparted to the pinion 26. The hub of the beater head 9 is provided with teeth forming a pinion 27 in the plane of the pinion 26.

The frame 23 and the pinions 25 and 26 carried thereby are held in a fixed position by a bar 28 which connects the frame 23 with one of the sills 1, holding the pinion 26 in a position at the rear of the axle 5. When the eccentric 8 is rotated about the axle 5 to carry the beater into its forward position, as shown by solid lines in Figs. 2 and 3, the pinion 27 is moved out of engagement with the pinion 26, but when the eccentric 8 and beater are moved into the positions indicated by the broken lines 18 and 19, Fig. 2, then the pinion 27 will be carried into engagement with the pinion 26, and the beater connected with the driving power.

The sills 1, 1 support bearings for sprocket wheel shafts by which the movable bottom is supported in the usual manner. One of these shafts is represented at 29 upon which the bottom 30 comprising hinged slats of the usual form is supported.

The improvements which are herein shown and described are peculiarly applicable to manure spreaders. In machines of this class it is desirable to have all of the gearing or power transmitting parts employed between the ground wheels and the beater housed or inclosed; and arranged in such way that, first, the active parts of the beater can be extended; 2nd, so that the load-carrying space in the body can be carried out to vertical planes near the faces of the ground wheels; 3rd, so that the number of parts constituting the power transmitting devices (the ground wheels, pinions, and the like) shall be as few in number as possible, to reduce to the minimum the liability of having particles of foreign material enter the gearing space and choke or clog and break the teeth; and, 4th, so that the beater can be quickly disconnected from the driving devices.

I have heretofore devised transmitting mechanisms of several sorts, including those of the planetary gear class, specially adapted for use in manure spreaders. The present mechanism possesses all of the above incidents and comprises a much smaller number of small rotary toothed parts, and reduces to the lowest point the danger of bursting or breaking the gearing by foreign material entering into the gear space. In this instance there is a secondary power transmitter, to wit, the pinion 25, which is supported from the framework and is in permanently stationary position. It is so situated that the beater, when forward and serving merely as an end-gate or mere stoppage for the load, is out of contact with this secondary driver, but when it is moved back from the rear end of the load it immediately engages with this driving wheel, which is constantly in rotation, ready to impart motion to the distributer. When the beater is forward, at the time the load-carrying body is being loaded, it can freely adapt itself by yielding around its axis to the pressure of the material in either direction, as it is entirely disengaged from all gear wheels except the driven gear concentrically secured to its end.

Reference is had to my copending application, Serial No. 652,421, filed October 2, 1911, wherein claims are presented to the eccentrically shiftable beater, to the driving means between the axle and the beater lying wholly within the confines of the beater, and to such driving means adapted to be brought into and out of operative driving relation upon the shifting to and fro of the eccentrically mounted beater. This application relates to the features that specially characterize the mechanism shown and described herein.

I claim,

1. In a manure spreader, a rotatable beater journaled on bearings rotatable about an axis eccentric to the axis of said beater, a driving gear having its axis eccentric to the axis of the beater, a pinion carried by the beater, an intermediate pinion driven by said driving gear, and means for rotating the bearings of the beater to carry the beater pinion into and out of engagement with said intermediate pinion.

2. In a manure spreader, a rotatable beater journaled on bearings rotatable about an axis eccentric to the axis of the beater, a driving mechanism for the beater comprising a driving gear having its axis eccentric to the axis of the beater, an intermediate pinion held in constant engagement with said driving gear, a pinion carried by the beater and capable of being carried into and out of operative connection with said intermediate pinion.

3. In a manure spreader, a rotatable beater journaled on bearings rotatable about an axis eccentric to the axis of the beater, a driving mechanism for said beater comprising a driving member consisting of an internal gear concentric with the axis of the beater bearings, and a driven member consisting of a pinion concentric with and carried by the beater and capable of being carried into and out of operative connection with said driving member by the rotation of the beater bearings.

4. In a fertilizer distributer, the combination of the load-carrying body having vertical side-walls, the power transmitting devices having a driven element carried by the beater, a driving element actuated by the ground wheels, and a secondary driving element actuated by the aforesaid driving element, the driven element on the beater and the secondary driving element being optionally separable.

5. In a manure spreader, the combination of the load-carrying body having vertical side-walls, the rotary beater arranged to extend from one side-wall to the other, the ground wheels, the gear wheel carried by the beater, the primary drive gear actuated by the ground wheel, the intermediate gear, the stationary supports secured to the body for the intermediate wheel, the beater gear and the intermediate gear being separable at will.

6. In a manure spreader, the combination of the load-carrying body, having vertical side-walls, the beater extending from one of said walls to the other, the ground wheels, the primary drive wheel actuated by the ground wheel, the driven wheel carried by the beater, the intermediate power transmitter, the said driving and driven gearing and transmitter being arranged in a chamber within and between the end planes of the beater, and a support for the transmitter extending out from said chamber and secured to the body substantially as set forth.

7. In a fertilizer distributer, the combination of a load carrying body, the beater, the driver element carried by the beater, a driving element actuated by the ground wheels, and a secondary driving element actuated by the first and permanently connected independently thereof to the body, the driven element on the beater being optionally separable from both of the driving elements.

8. The combination of the body, the axle, the beater, a driving wheel actuated by the axle, a driven wheel carried by the beater, an intermediate wheel, and a holder therefor fixed in relation to the body, the driven wheel and the intermediate wheel being separable at option.

9. The combination of the axle, the beater, the driving wheel on the axle, the driven wheel on the beater, and the intermediate transmitting wheel supported loosely relatively to the aforesaid wheel, the driven wheel and the beater being movable toward and from the intermediate wheel.

10. The combination of the axle, the beater, the driving wheel carried by the axle, the driven wheel carried by the beater, the movable bearings for the beater on the axle, and the intermediate transmitting wheel on an axis fixed in relation to the body, the wheel on the beater being movable toward and from the intermediate wheel.

11. The combination of the body, the axle, the beater, the driving wheel on the axle, the driven wheel on the beater, and the intermediate wheel held bodily fixed by the body, the driven wheel and the intermediate wheel being arranged to be connected and disconnected by the movement of one bodily relatively to the other.

12. The combination of the axle, the beater, the eccentric bearings on the axle for the beater, the driving member actuated by the ground wheels, the intermediate driving member, the driven member carried by the beater and adapted to be moved with the said eccentric bearings into and out of operative connection with the driving member.

13. The combination of the ground wheels, the axle, the beater rotating around the axis of the ground wheels, the main driving gear wheel actuated by the ground wheels, the driven gear wheel concentric with the beater and secured thereto, the intermediate driving gear wheel and the means for moving the beater and the driven wheel bodily toward and from the intermediate driving wheel.

Dated this 29th day of September 1911.

THEOPHILUS BROWN.

Witnesses:
NELLIE WHALEN,
PENELOPE COMBIRBACH.